(12) United States Patent
Hausermann et al.

(10) Patent No.: US 11,962,469 B2
(45) Date of Patent: Apr. 16, 2024

(54) IDENTIFYING DEVICES AND DEVICE INTENTS IN AN IOT NETWORK

(71) Applicant: Cisco Technology, Inc., San Jose, CA (US)

(72) Inventors: Laurent Jean Charles Hausermann, Lyons (FR); Maik Guenter Seewald, Nuremberg (DE); André Guérard, Saint Etienne (FR); Ruben Gerald Lobo, Raleigh, NC (US); Daniel R. Behrens, Chardon, OH (US); Gulian Lorini, Lyons (FR); Laetitia Pot, Lyons (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 17/172,820

(22) Filed: Feb. 10, 2021

(65) Prior Publication Data

US 2022/0255805 A1 Aug. 11, 2022

(51) Int. Cl.
*H04L 41/12* (2022.01)
*G06N 20/00* (2019.01)
(Continued)

(52) U.S. Cl.
CPC ............ *H04L 41/12* (2013.01); *G06N 20/00* (2019.01); *G16Y 20/10* (2020.01); *G16Y 20/20* (2020.01);
(Continued)

(58) Field of Classification Search
CPC . H04L 41/12; H04L 41/0853; H04L 41/0873; H04L 61/2567; H04L 43/062;
(Continued)

(56) References Cited

U.S. PATENT DOCUMENTS 6,370,141 B1 * 4/2002 Giordano, III ...... H04M 1/2478
370/386
6,532,217 B1 * 3/2003 Alkhatib ............... H04L 69/166
370/254
(Continued)

OTHER PUBLICATIONS

"Cyber Vision Distributed Edge Active Discovery", Solution Note, Oct. 25, 2020, 4 pages, Cisco Systems, Inc.
(Continued)

*Primary Examiner* — Hitesh Patel
*Assistant Examiner* — Vinh Nguyen
(74) *Attorney, Agent, or Firm* — BEHMKE INNOVATION GROUP LLC; James M. Behmke; James J. Wong (57) ABSTRACT

According to one or more embodiments of the disclosure, an asset inventory service executed by one or more devices receives telemetry data collected passively by a sensor application regarding a node in a network. The asset inventory service requests, after receiving the telemetry data, that the sensor application perform active discovery of nodes in the network. The asset inventory service receives active discovery data collected by the sensor application via active discovery of nodes in the network. The asset inventory service generates, based on the telemetry data and the active discovery data, an identity profile for the node.

14 Claims, 6 Drawing Sheets

(51) Int. Cl.
*G16Y 20/10* (2020.01)
*G16Y 20/20* (2020.01)
*G16Y 40/10* (2020.01)
*H04L 41/0853* (2022.01)
*H04L 61/2567* (2022.01)

(52) U.S. Cl.
CPC .......... *G16Y 40/10* (2020.01); *H04L 41/0853* (2013.01); *H04L 61/2567* (2013.01)

(58) Field of Classification Search
CPC ..... H04L 41/0894; H04L 41/16; H04L 41/40; H04L 61/2503; H04L 61/2571; H04L 2101/686; G06N 20/00; G16Y 20/10; G16Y 30/00; G16Y 40/00; G16Y 40/10; G16Y 40/20; G16Y 40/30; G16Y 40/35; G16Y 40/40; G16Y 20/20
See application file for complete search history.

(56) References Cited

U.S. PATENT DOCUMENTS

| | | | | |
|---|---|---|---|---|
| 7,227,838 | B1* | 6/2007 | O'Riordan | H04L 45/586 |
| | | | | 709/224 |
| 8,228,954 | B2 | 7/2012 | Thubert et al. | |
| 8,626,912 | B1* | 1/2014 | Rothstein | H04L 43/04 |
| | | | | 709/224 |
| 8,739,178 | B2* | 5/2014 | Bosold | H04L 67/025 |
| | | | | 700/286 |
| 9,582,233 | B1* | 2/2017 | Osadchyy | H04L 41/0677 |
| 10,050,840 | B2 | 8/2018 | Zheng et al. | |
| 10,440,577 | B1* | 10/2019 | Vasseur | H04W 4/70 |
| 10,749,763 | B2* | 8/2020 | Garg | H04L 61/5076 |
| 2004/0213271 | A1* | 10/2004 | Lovy | H04L 67/56 |
| | | | | 370/401 |
| 2005/0015378 | A1* | 1/2005 | Gammel | G06F 12/1009 |
| 2008/0127210 | A1* | 5/2008 | Bosold | H02J 13/00034 |
| | | | | 719/313 |
| 2010/0098082 | A1* | 4/2010 | Sampath | H04L 45/00 |
| | | | | 370/392 |
| 2012/0166628 | A1* | 6/2012 | Kullos | H04N 21/64322 |
| | | | | 709/224 |
| 2013/0148547 | A1* | 6/2013 | Page | H04L 41/12 |
| | | | | 370/255 |
| 2014/0222987 | A1* | 8/2014 | Pearson | H04L 61/5014 |
| | | | | 709/224 |
| 2014/0344568 | A1* | 11/2014 | Yang | H04L 63/1466 |
| | | | | 713/162 |
| 2014/0371882 | A1* | 12/2014 | Nikhra | G05B 13/02 |
| | | | | 700/89 |
| 2015/0074260 | A1* | 3/2015 | Anand B.S | H04L 12/10 |
| | | | | 709/224 |
| 2015/0172124 | A1* | 6/2015 | Piccinini | H02J 13/00 |
| | | | | 307/11 |
| 2015/0195176 | A1* | 7/2015 | Vasseur | H04L 43/12 |
| | | | | 709/224 |
| 2016/0057101 | A1* | 2/2016 | Hugard, IV | H04L 63/105 |
| | | | | 709/220 |
| 2016/0283828 | A1* | 9/2016 | Osadchyy | G06K 15/1823 |
| 2016/0373274 | A1* | 12/2016 | Sivanthi | H04L 12/4633 |
| 2017/0222973 | A1* | 8/2017 | Bangma | H04L 47/805 |
| 2017/0242555 | A1 | 8/2017 | Wragg et al. | |
| 2017/0272373 | A1* | 9/2017 | Chau | H04L 45/72 |
| 2018/0144139 | A1* | 5/2018 | Cheng | H04L 63/1425 |
| 2019/0097835 | A1* | 3/2019 | Bhat | G06F 8/654 |
| 2019/0098028 | A1* | 3/2019 | Ektare | H04L 43/12 |
| 2019/0116087 | A1* | 4/2019 | Hiller | H04L 67/12 |
| 2019/0123959 | A1 | 4/2019 | Joshi et al. | |
| 2020/0021488 | A1 | 1/2020 | Joshi et al. | |
| 2020/0128392 | A1* | 4/2020 | Li | H04W 8/205 |
| 2020/0374304 | A1* | 11/2020 | Rodriguez Bravo | G06F 21/6245 |
| 2021/0014710 | A1* | 1/2021 | Raju | H04W 4/38 |
| 2021/0211452 | A1* | 7/2021 | Patel | H04L 63/1416 |

OTHER PUBLICATIONS

Niedermaier, et al., "Network Scanning and Mapping for IIoT Edge Node Device Security", online: https://arxiv.org/pdf/1910.07622.pdf, Oct. 16, 2019, 10 pages, Arxiv.org.

"Cisco Identity Services Engine", Data Sheet, online: https://www.cisco.com/c/en/us/products/collateral/security/identity-services-engine/data_sheet_c78-656174.pdf, Nov. 29, 2020, 8 pages, Cisco Systems, Inc.

Sherry, Chris, "Advantages and Disadvantages of Active vs. Passive Scanning in IT and OT Environments", Apr. 21, 2020, 6 pages, Infosecurity-Magazine.com.

Greenfield, David, "Choosing Between Passive or Active Asset Discovery", Oct. 2, 2018, 3 pages, AutomationWorld.com.

"Substation Configuration Language", online: https://en.wikipedia.org/wiki/Substation_Configuration_Language, Nov. 27, 2019, 2 pages, Wikimedia Foundation, Inc.

* cited by examiner

IDENTIFYING DEVICES AND DEVICE INTENTS IN AN IOT NETWORK

TECHNICAL FIELD

The present disclosure relates generally to computer networks, and, more particularly, to identifying devices and device intents in an Internet of Things (IoT) network.

BACKGROUND

The Internet of Things, or "IoT" for short, represents an evolution of computer networks that seeks to connect many everyday objects to the Internet. Notably, there has been a recent proliferation of 'smart' devices that are Internet-capable such as thermostats, lighting, televisions, cameras, and the like. In many implementations, these devices may also communicate with one another. For example, an IoT motion sensor may communicate with one or more smart lightbulbs, to actuate the lighting in a room when a person enters the room.

Industrial IoT (IIoT) networks are also becoming increasingly common, whereby IoT devices are deployed to industrial settings such as factories, mines, and the like. Today, many IIoT networks even leverage more traditional Information Technology (IT) network mechanisms including Internet Protocol (IP) routing, Network Address Translation (NAT), dual attachment for redundancy purposes, etc. As a result, a particular IIoT device may have multiple network identities, which can lead to the incorrect determination that a singular device is actually multiple devices on the network. The use of NAT in an IIoT network can also defeat device discovery approaches that rely on active scanning, as centralized active discovery approaches cannot penetrate NAT boundaries. Indeed, many IIoT networks are arranged into units such as cells, zones, bays, etc., with IP addresses being repeated across units for ease of deployment.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, an asset inventory service executed by one or more devices receives telemetry data collected passively by a sensor application regarding a node in a network. The asset inventory service requests, after receiving the telemetry data, that the sensor application perform active discovery of nodes in the network. The asset inventory service receives active discovery data collected by the sensor application via active discovery of nodes in the network. The asset inventory service generates, based on the telemetry data and the active discovery data, an identity profile for the node.

DESCRIPTION

A computer network is a geographically distributed collection of nodes interconnected by communication links and segments for transporting data between end nodes, such as personal computers and workstations, or other devices, such as sensors, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications, and others. Other types of networks, such as field area networks (FANs), neighborhood area networks (NANs), personal area networks (PANs), etc. may also make up the components of any given computer network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT involves the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Often, IoT networks operate within a shared-media mesh networks, such as wireless or Powerline Communication networks, etc., and are often on what is referred to as Low-Power and Lossy Networks (LLNs), which are a class of network in which both the routers and their interconnect are constrained. That is, LLN devices/routers typically operate with constraints, e.g., processing power, memory, and/or energy (battery), and their interconnects are characterized by, illustratively, high loss rates, low data rates, and/or instability. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks) to the cloud (e.g., centralized and/or shared resources, as will be understood by those skilled in the art). That is, generally, fog computing entails using devices at the network edge to provide application services, including computation, networking, and storage, to the local nodes in the network, in contrast to cloud-based approaches that rely on remote data centers/cloud environments for the services. To this end, a fog node is a functional node that is deployed close to fog endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer configuration.

Low power and Lossy Networks (LLNs), e.g., certain sensor networks, may be used in a myriad of applications such as for "Smart Grid" and "Smart Cities." A number of challenges in LLNs have been presented, such as:

1) Links are generally lossy, such that a Packet Delivery Rate/Ratio (PDR) can dramatically vary due to various sources of interferences, e.g., considerably affecting the bit error rate (BER);

2) Links are generally low bandwidth, such that control plane traffic must generally be bounded and negligible compared to the low rate data traffic;

3) There are a number of use cases that require specifying a set of link and node metrics, some of them being dynamic, thus requiring specific smoothing functions to avoid routing instability, considerably draining bandwidth and energy;

4) Constraint-routing may be required by some applications, e.g., to establish routing paths that will avoid non-encrypted links, nodes running low on energy, etc.;

5) Scale of the networks may become very large, e.g., on the order of several thousands to millions of nodes; and 6) Nodes may be constrained with a low memory, a reduced processing capability, a low power supply (e.g., battery).

In other words, LLNs are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen and up to thousands or even millions of LLN routers, and support point-to-point traffic (between devices inside the LLN), point-to-multipoint traffic (from a central control point to a subset of devices inside the LLN) and multipoint-to-point traffic (from devices inside the LLN towards a central control point).

An example implementation of LLNs is an "Internet of Things" network. Loosely, the term "Internet of Things" or "IoT" may be used by those in the art to refer to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, HVAC (heating, ventilating, and air-conditioning), windows and window shades and blinds, doors, locks, etc. The "Internet of Things" thus generally refers to the interconnection of objects (e.g., smart objects), such as sensors and actuators, over a computer network (e.g., IP), which may be the Public Internet or a private network. Such devices have been used in the industry for decades, usually in the form of non-IP or proprietary protocols that are connected to IP networks by way of protocol translation gateways. With the emergence of a myriad of applications, such as the smart grid advanced metering infrastructure (AMI), smart cities, and building and industrial automation, and cars (e.g., that can interconnect millions of objects for sensing things like power quality, tire pressure, and temperature and that can actuate engines and lights), it has been of the utmost importance to extend the IP protocol suite for these networks.

Figure 1:
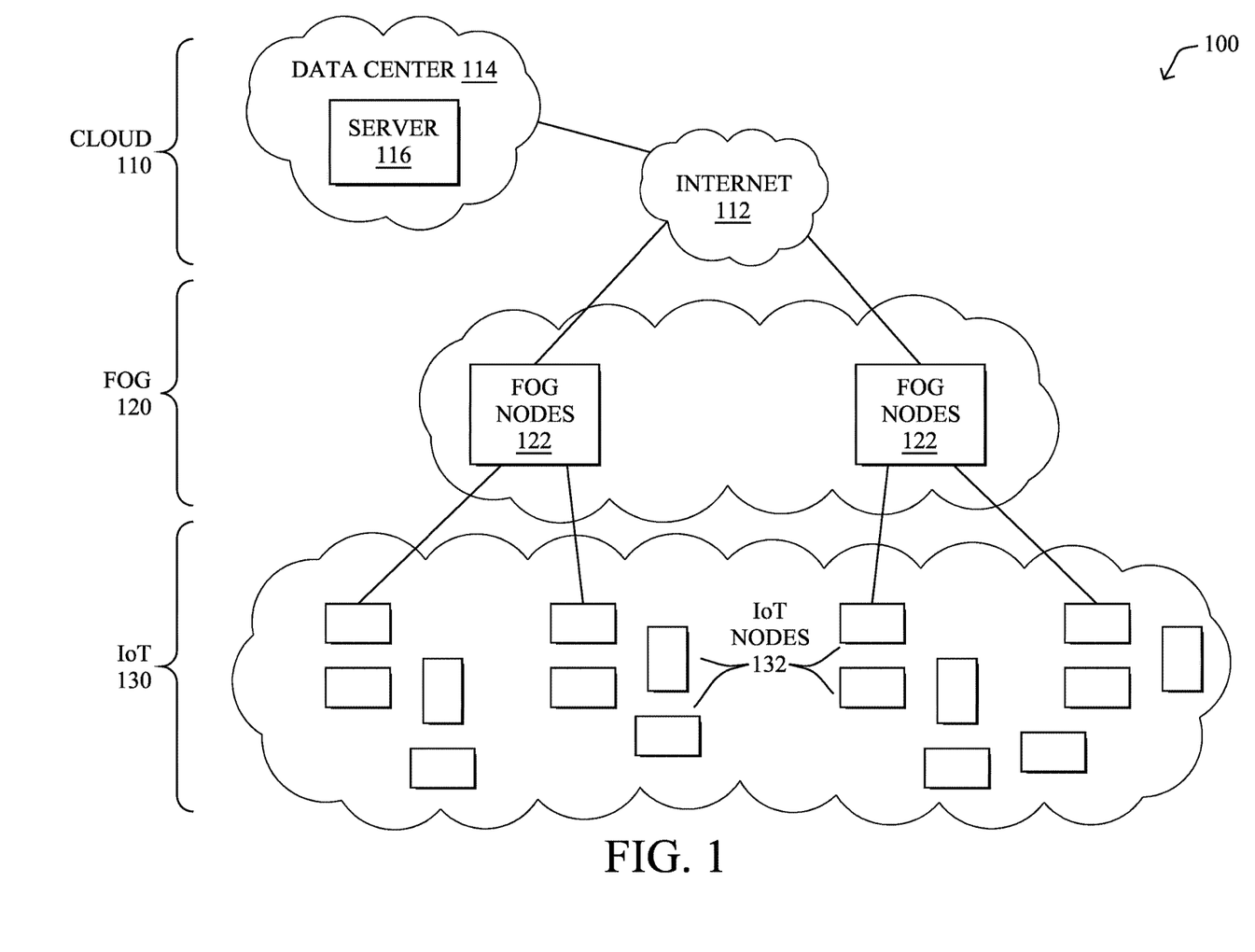
FIG. 1 illustrate an example network.

FIG. 1 is a schematic block diagram of an example simplified computer network 100 illustratively comprising nodes/devices at various levels of the network, interconnected by various methods of communication. For instance, the links may be wired links or shared media (e.g., wireless links, powerline communication links, etc.) where certain nodes, such as, e.g., routers, sensors, computers, etc., may be in communication with other devices, e.g., based on connectivity, distance, signal strength, current operational status, location, etc.

Specifically, as shown in the example IoT network 100, three illustrative layers are shown, namely cloud layer 110, fog layer 120, and IoT device layer 130. Illustratively, cloud layer 110 may comprise general connectivity via the Internet 112, and may contain one or more datacenters 114 with one or more centralized servers 116 or other devices, as will be appreciated by those skilled in the art. Within a fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. For example, fog nodes/devices 122 may include edge routers and/or other networking devices that provide connectivity between cloud layer 110 and IoT device layer 130. Data packets (e.g., traffic and/or messages sent between the devices/nodes) may be exchanged among the nodes/devices of the computer network 100 using predefined network communication protocols such as certain known wired protocols, wireless protocols, powerline communication protocols, or other shared-media protocols where appropriate. In this context, a protocol consists of a set of rules defining how the nodes interact with each other.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure.

Data packets (e.g., traffic and/or messages) may be exchanged among the nodes/devices of the computer network 100 using predefined network communication protocols such as certain known wired protocols, wireless protocols (e.g., IEEE Std. 802.15.4, Wi-Fi, Bluetooth®, DECT-Ultra Low Energy, LoRa, etc.), powerline communication protocols, or other shared-media protocols where appropriate. In this context, a protocol consists of a set of rules defining how the nodes interact with each other.

Figure 2:
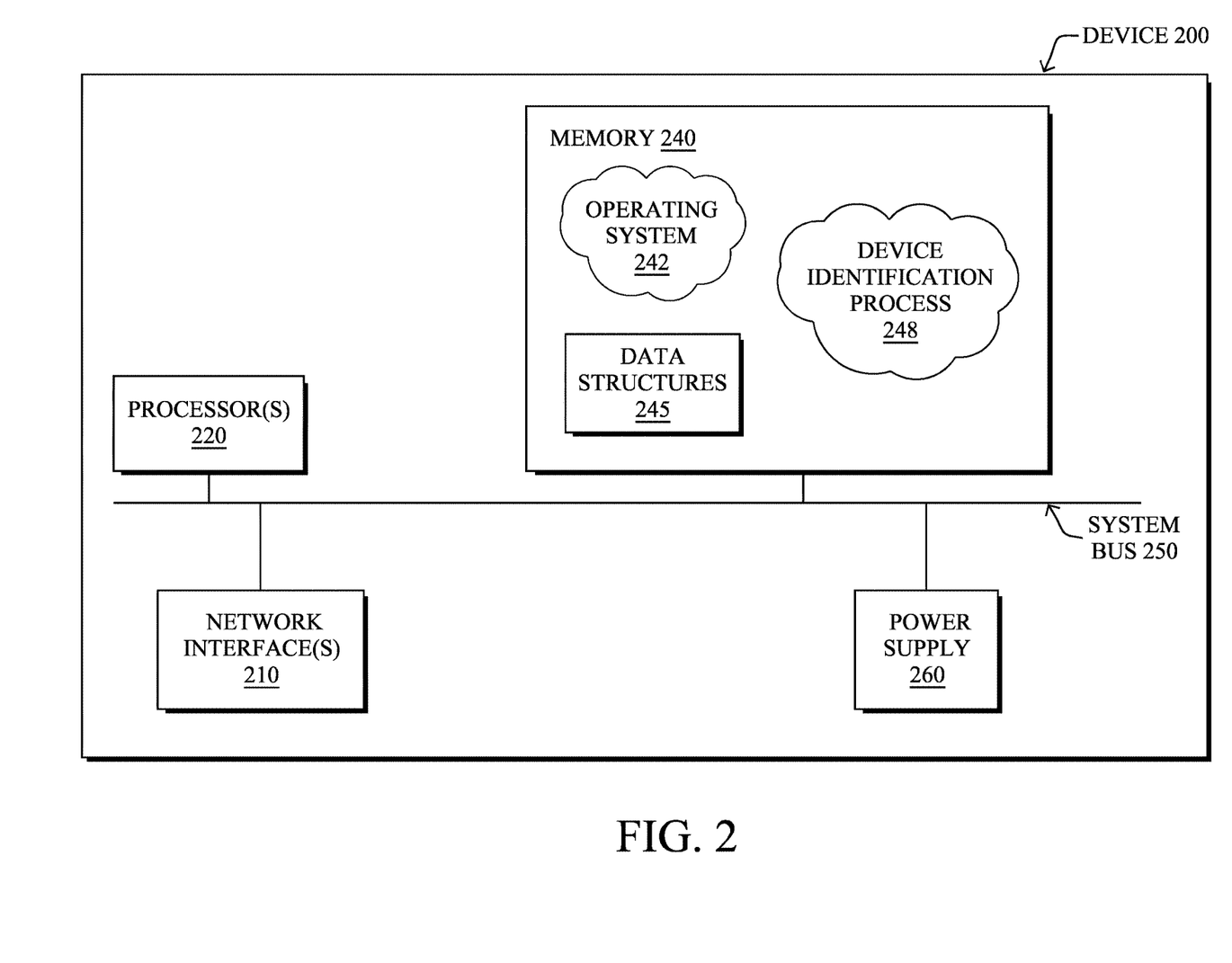
FIG. 2 illustrates an example network device/node.

FIG. 2 is a schematic block diagram of an example node/device 200 that may be used with one or more embodiments described herein, e.g., as any of the nodes or devices shown in FIG. 1 above or described in further detail below. The device 200 may comprise one or more network interfaces 210 (e.g., wired, wireless, etc.), at least one processor 220, and a memory 240 interconnected by a system bus 250, as well as a power supply 260 (e.g., battery, plug-in, etc.).

Network interface(s) 210 include the mechanical, electrical, and signaling circuitry for communicating data over links coupled to the network. The network interfaces 210 may be configured to transmit and/or receive data using a variety of different communication protocols, such as TCP/IP, UDP, etc. Note that the device 200 may have multiple different types of network connections via network interface(s) 210, e.g., wireless and wired/physical connections, and that the view herein is merely for illustration. Also, while the network interface 210 is shown separately from power supply 260, for powerline communications the network interface 210 may communicate through the power supply 260, or may be an integral component of the power supply. In some specific configurations the powerline communication signal may be coupled to the power line feeding into the power supply.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a device identification process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, device identification process 248 may be configured to perform any or all of the following tasks:
1. Identifying and classifying devices in the network—this may entail, for example, determining the make, model, software configuration, type, etc. of a given device.
2. Discerning operational insights about a device—for example, device identification process 248 may assess the traffic of a particular device, to determine what the device is doing, or attempting to do, via the network. Such information may take the form of device details and communication maps for the device. In further cases, the device functions and application flows may be converted into tags and/or events for presentation to a user interface. Further, process 248 may also track variable changes, to monitor the integrity of the industrial workflow.

In various embodiments, device identification process 248 may employ any number of machine learning techniques, to assess the gathered telemetry data regarding the traffic of the device. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, device identification process 248 can use the model M to classify new data points, such as information regarding new traffic flows in the network. Often, M is a statistical model, and the cost function is inversely proportional to the likelihood of M, given the input data.

In various embodiments, device identification process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is "normal," or "suspicious." On the other end of the spectrum are unsupervised techniques that do not require a training set of labels. Notably, while a supervised learning model may look for previously seen attack patterns that have been labeled as such, an unsupervised model may instead look to whether there are sudden changes in the behavior of the network traffic. Semi-supervised learning models take a middle ground approach that uses a greatly reduced set of labeled training data.

Example machine learning techniques that device identification process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

In some cases, device identification process 248 may assess the captured telemetry data on a per-flow basis. In other embodiments, device identification process 248 may assess telemetry data for a plurality of traffic flows based on any number of different conditions. For example, traffic flows may be grouped based on their sources, destinations, temporal characteristics (e.g., flows that occur around the same time, etc.), combinations thereof, or based on any other set of flow characteristics.

Figure 3:
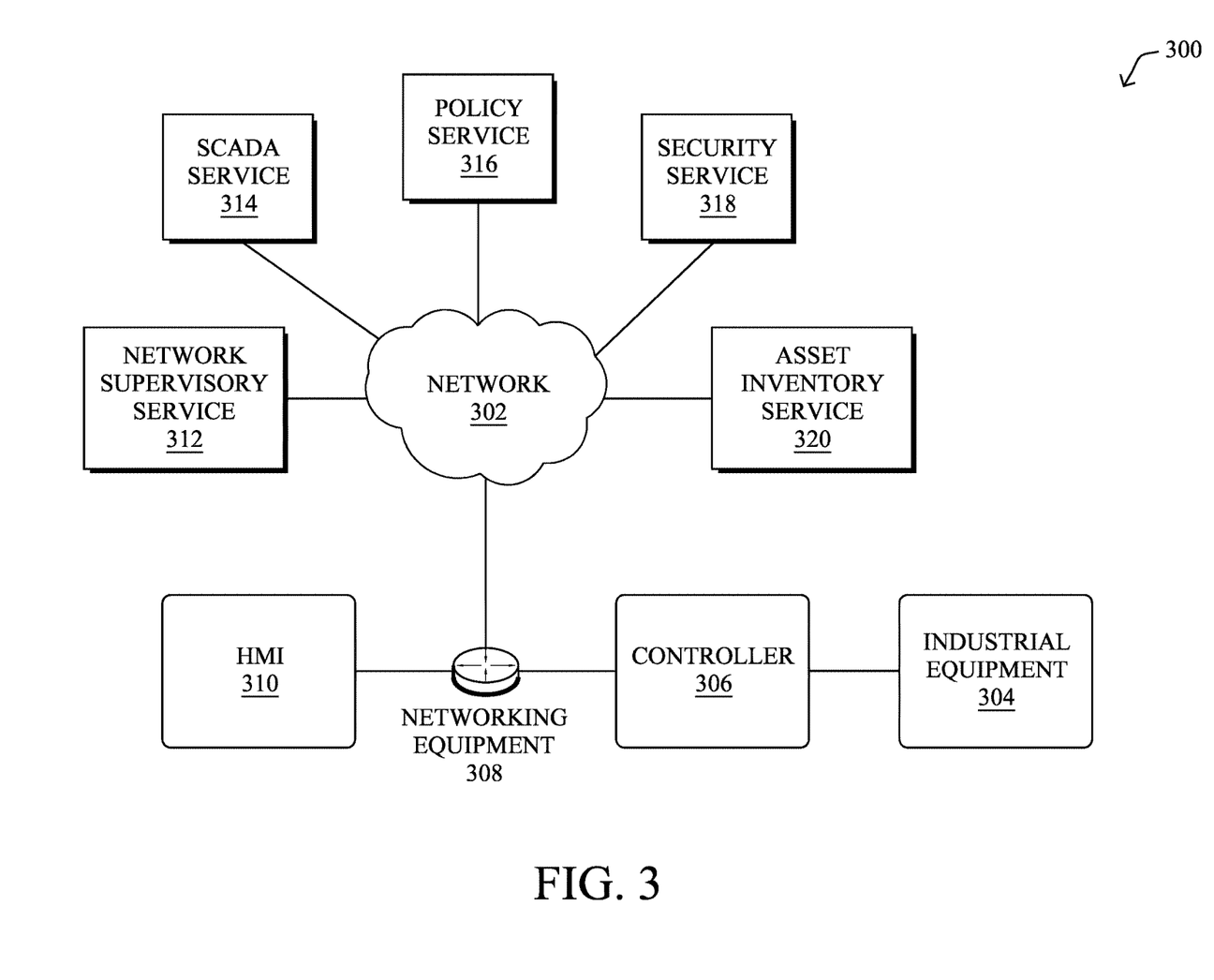
FIG. 3 illustrates an example network architecture for an industrial network.

FIG. 3 illustrates an example network architecture 300 for an industrial network, according to various embodiments. As shown, architecture 300 may include industrial equipment 304 connected to a controller 306, such as a programmable logic controller (PLC), a substation intelligent electronic device (IED), a variable frequency device (VFD), a remote terminal unit (RTU), or the like, that controls the operations of industrial equipment 304. In turn, controller 306 for industrial equipment 304 may be connected to an HMI 310 via networking equipment 308, allowing a human user to interface with it (e.g., to visualize the industrial process, issue commands, etc.). In addition, networking equipment 308 may also provide connectivity via the greater network 302 to any number of network services 312-320 provided in the local network of networking equipment 308 and/or remotely. For example, services 312-320 may be implemented in the local network via dedicated equipment or virtualized across any number of devices (e.g., networking equipment 308). In other cases, services 312-320 may be provided by servers in a remote data center, the cloud, or the like.

As would be appreciated, industrial equipment 304 may differ, depending on the industrial setting in which architecture 300 is implemented. In many cases, industrial equipment 304 may comprise an actuator such as, but not limited to, a motor, a pump, a solenoid, or the like. In other cases, industrial equipment 304 may include a circuit and controller 306 may control the powering of the circuit.

Industrial equipment 304 may also include any number of sensors configured to take measurements regarding the physical process implemented by industrial equipment 304. For example, such sensors may take temperature readings, distance measurements, humidity readings, voltage or amperage measurements, or the like, and provide them to controller 306 for industrial equipment 304. During operation, controller 306 may use the sensor data from industrial equipment 304 as part of a control loop, thereby allowing controller 306 to adjust the industrial process as needed.

HMI 310 may include a dedicated touch screen display or may take the form of a workstation, portable tablet or other handheld, or the like. Thus, during operation, visualization data may be provided to HMI 310 regarding the industrial process performed by industrial equipment 304. For example, such visualizations may include a graphical representation of the industrial process (e.g., the filling of a tank, etc.), the sensor data from industrial equipment 304, the control parameter values used by controller 306, or the like. In some embodiments, HMI 310 may also allow for the reconfiguration of controller 306, such as by adjusting its control parameters for industrial equipment 304 (e.g., to shut down the industrial process, etc.).

Networking equipment 308 may include any number of switches, routers, firewalls, telemetry exporters and/or collectors, gateways, bridges, and the like. In some embodiments, these networking functions may be performed in a virtualized/containerized manner. For example, a telemetry exporter may take the form of a containerized application installed to networking equipment 308, to collect and export telemetry regarding the operation networking equipment 308 (e.g., queue state information, memory or processor resource utilization, etc.) and/or network 302 (e.g., measured delays, drops, jitter, etc.).

In some embodiments, at least a portion of network 302 may be implemented as a software-defined network (SDN). In such implementations, control plane decisions by the networking equipment of network 302, such as networking equipment 308, may be centralized with an SDN controller. For example, rather than networking equipment 308 establishing routing paths and making other control decisions, individually, such decisions can be centralized with an SDN controller (e.g., network supervisory service 312, etc.).

During operation, network supervisory service 312 may function to monitor the status and health of network 302 and networking equipment 308. An example of such a network supervisory service is DNA-Center by Cisco Systems, Inc. For example, in some implementations, network supervisory service 312 may take the form of a network assurance service that assesses the health of network 302 and networking equipment 308 through the use of heuristics, rules, and/or machine learning models. In some cases, this monitoring can also be predictive in nature, allowing network supervisory service 312 to predict failures and other network conditions before they actually occur. In either case, network supervisory service 312 may also provide control over network 302, such as by reconfiguring networking equipment 308, adjusting routing in network 302, and the like. As noted above, network supervisory service 312 may also function as an SDN controller for networking equipment 308, in some embodiments.

As shown, architecture 300 may also include SCADA service 314 which supervises the operation of the industrial process. More specifically, SCADA service 314 may communicate with controller 306, to receive data regarding the industrial process (e.g., sensor data from industrial equipment 304, etc.) and provide control over controller 306, such as by pushing new control routines, software updates, and the like, to controller 306.

As would be appreciated, SCADA service 314, controller 306, and/or HMI 310 may communicate using an automation protocol. Examples of such protocols may include, but are not limited to, Profibus, Modbus, DeviceNet, HART, DNP3, IEC 61850, IEC 60870-5, and the like. In addition, different protocols may be used within network 102 and among networking equipment 308, depending on the specific implementation of architecture 300. Further, different portions of network 302 may be organized into different cells or other segmented areas that are distinct from one another and interlinked via networking equipment 308.

Architecture 300 may also include a policy service 316 that is responsible for creating and managing security and access policies for endpoints in network 302. An example of such a policy service 316 is the Identity Services Engine (ISE) by Cisco Systems, Inc. In various embodiments, as detailed below, policy service 316 may also be configured to identify the types of endpoints present in network 302 (e.g., HMI 310, controller 306, etc.) and their corresponding actions/functions. In turn, this information can be used to drive the policies that policy service 316 creates.

Security service 318 is configured to enforce the various policies created and curated by policy service 316 in the network. For example, such policies may be implemented by security service 318 as access control lists (ACLs), firewall rules, or the like, that are distributed to networking equipment 308 for enforcement.

According to various embodiments, architecture 300 may also include asset inventory service 320 that is used to collect information about learned assets/nodes in network 302 and maintain an inventory of these various devices in network 302. Thus, as new devices are discovered in network 302, their profile information is added to the live inventory of devices maintained by asset inventory service 320. In turn, these identity profiles can be used to drive policies (e.g., by services 312-318), according to the 'intents' of the assets/nodes. For instance, if the identity profile for a particular node indicates its manufacturer, type, etc., as well as its location in the network, access control lists (ACLS), network overlays, and the like, can be configured in the network for the node (e.g., to prevent the node from communicating with other nodes with whom it does not need to communicate, etc.).

As noted above, industrial IoT (IIoT) networks are increasingly leveraging more traditional Information Technology (IT) network mechanisms including Internet Protocol (IP) routing, Network Address Translation (NAT), dual attachment for redundancy purposes, and the like. This shift has presented a number of problems with respect to traditional approaches to device identification and asset inventorying, which typically rely on traffic mirroring using the Switch Port Analyzer (SPAN) protocol from a centralized location. However, many IIoT networks are now deployed using a 'cookie-cutter' approach whereby discrete manufacturing or other control segments are deployed using duplicate IP addresses.

In other words, the network may comprise a plurality of units, such as cells, zones, bays, etc., with addresses being repeated across units. Accordingly, each unit/network division may rely on a NAT device, to allow the operations and control systems located in level 3 of the Purdue model to communicate with the nodes located at the lower levels of the Purdue model (e.g., in a cell/area, zone, etc.). However, only a small fraction of the nodes in such a division typically need to communicate with the site operations layer. As a result of this setup, centralized device discovery systems cannot communicate with a large majority of the nodes across the NAT boundary, whose IP addresses are not translated.

In addition to the above, it is also likely that a given node in an IIoT network will exhibit multiple network identities. Indeed, when observing an IIoT node, standard monitoring techniques, such as Network, MAC addresses, IP addresses, etc., often cannot be relied upon as unique identifiers for the nodes (e.g., due to the use of NAT, dual attachment, etc.). Consequently, a singular node may appear to the device discovery mechanism as multiple devices. For example, a node observed via traffic flow analysis may be seen from its true MAC address, as well as from the MAC address of its corresponding router, if observed from the LAN or above the interface of the router. As another example, some nodes now include multiple network interfaces for attachment to the network, which can each appear as its own node, even though they are all part of the same physical node/device.

Identifying Devices and Device Intents in an IoT Network

The techniques introduced herein allow for the identification of devices/nodes and device intents in an IoT network and are well-suited for IIoT networks that use modern IT mechanisms, such as NAT, redundant network interfaces, and the like. In some aspects, the techniques herein allow for the correlation of data collected regarding a node, to avoid that node from being detected as multiple nodes. In further aspects, the techniques herein introduce a control loop-based mechanism whereby sensor applications deployed across a NAT boundary are able to detect nodes/devices for purposes of asset inventorying and driving intent-based policies for those nodes.

Illustratively, the techniques described herein may be performed by hardware, software, and/or firmware, such as in accordance with the device identification process 248, which may include computer executable instructions executed by the processor 220 (or independent processor of interfaces 210) to perform functions relating to the techniques described herein.

Specifically, according to various embodiments, an asset inventory service executed by one or more devices receives telemetry data collected passively by a sensor application regarding a node in a network. The asset inventory service requests, after receiving the telemetry data, that the sensor application perform active discovery of nodes in the network. The asset inventory service receives active discovery data collected by the sensor application via active discovery of nodes in the network. The asset inventory service generates, based on the telemetry data and the active discovery data, an identity profile for the node.

Figure 4:
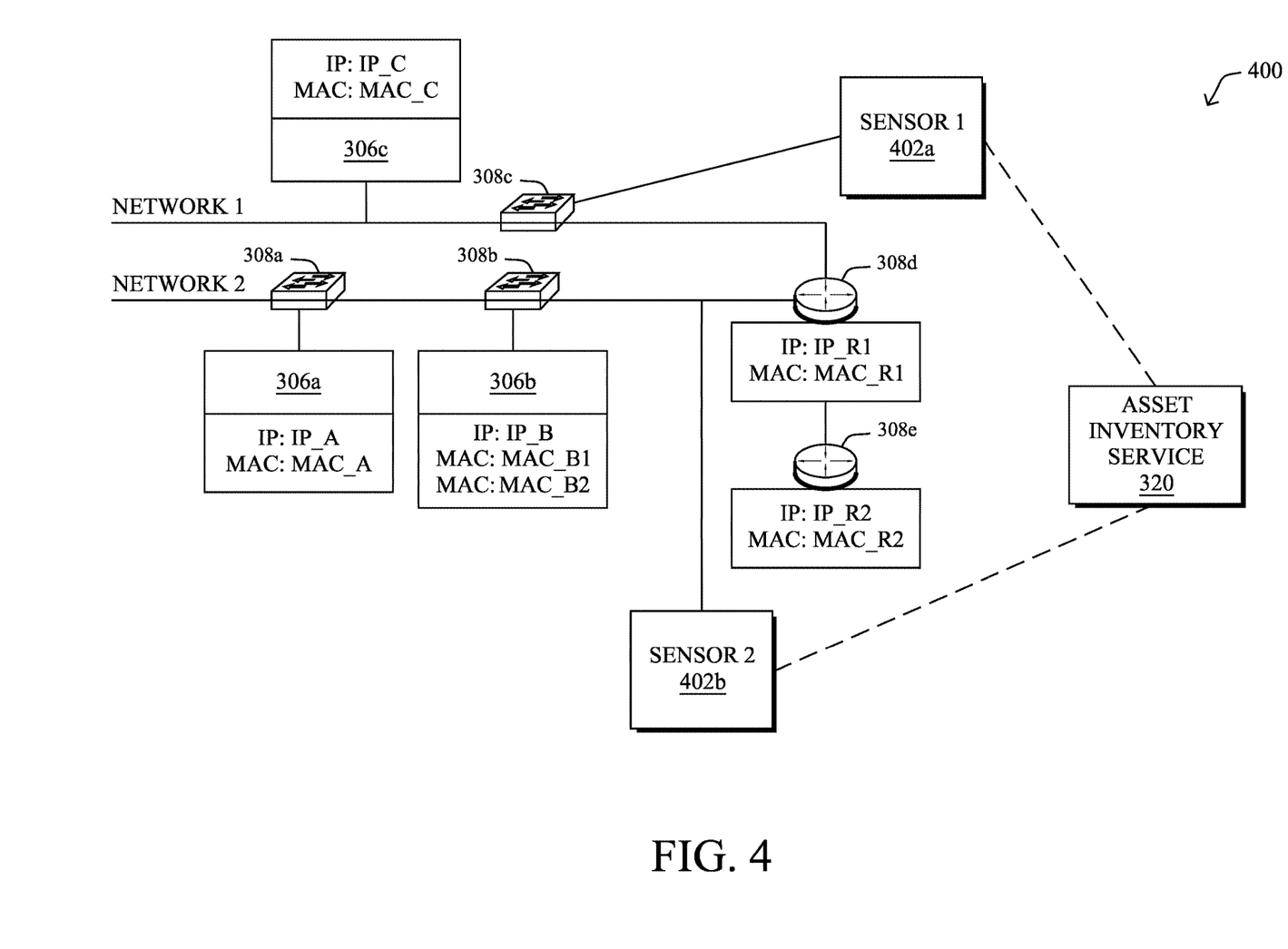
FIG. 4 illustrates an example of the deployment of sensor applications to multiple network locations.

Operationally, FIG. 4 illustrates an example 400 of the deployment of sensor applications to multiple network locations, according to various embodiments. As shown, assume that there are a plurality of controllers 306 and networking equipment 308 deployed across two networks. For simplicity, other network components, such as industrial equipment 304, an HMI 310, etc., have been omitted.

More specifically, assume that there is a first controller 306a having an (IP address, MAC address) pair of (IP_A, MAC_A), a second controller 306b having (IP_B, MAC_B1) and (IP_B, MAC_B2) (e.g., due to having two network interfaces), and a third controller 306c having (IP_C, MAC_C).

To support the communications of controllers 306a-306c, assume further that there is also networking equipment 308, such as switches 308a-308c and routers 308d-308e. Here, let router 308d have an (IP address, MAC address) pair of (IP_R1, MAC_R1) and let router 308e have one of (IP_R2, MAC_R2).

As a result of the above configurations, a number of (IP address, MAC pairs) may be observed at various points in the network as follows:
 (IP_A, MAC_A)
 (IP_B, MAC_B1)
 (IP_B, MAC_B2)
 (IP_C, MAC_C)
 (IP_A, MAC_R1)
 (IP_A, MAC_R2)
 (IP_B, MAC_R1)
 (IP_B, MAC_R2)

In other words, even though a particular node is a singular, physical device, it may appear on the network as multiple devices (e.g., by inheriting the MAC address of its associated router, etc.).

According to various embodiments, the techniques herein introduce a reconciliation approach that allows for the identification of singular nodes in a network, even when they exhibit multiple addresses or other network identifiers. In general, this approach entails performing the following:

1. Monitor nodes from different, distributed locations within the networks, by deploying sensor applications to selected networking equipment 308.
2. Using the sensor applications to perform Deep Packet Inspection (DPI) on observed traffic, to extract traffic properties from the traffic.
3, Sample a set of node properties using active scanning of the nodes.
4. Collect, classify, and analyze engineering and configuration data associated with the nodes.
5. Correlate of the above properties with the observed network addresses/identifiers, to associate nodes with singular asset/node identity profiles.

For instance, as shown, assume that asset inventory service 320 has deployed sensor applications 402a-402b for execution by switches 308c, 308b, respectively. In various embodiments, such sensor applications may be deployed to switches, routers, gateways, or the like, depending on the specific architecture of the network(s) involved. As would be appreciated, monitoring nodes from multiple locations can lead to better insights into the nodes for purposes of identification.

When executed, sensor applications 402a-402b may capture traffic crossing their respective switches and inspect them using DPI, to collect telemetry data regarding controllers 306, passively. Such collected telemetry data may indicate, for instance, the communication protocols that they use, as well as protocol-based identifiers like name, device type, version number, etc. In turn, sensor applications 402a-402b may provide the collected telemetry data back to asset inventory service 320.

For instance, the device type may indicate a particular node as being one of the following:
- Controller (e.g.: PLC)
- Human Machine Interfaces (HMI) Devices
- Heating, Ventilation. and Air Conditioning (HVAC) Devices
- Inverter
- I/O Devices
- Etc.

Similarly, example name fields that may be extracted by a sensor agent 402 are as follows:
- Windows: name-netbios, os-name
- Networking: name-lldp, cdp-device-id
- Siemens: name-s7plus-plc, name-s7-plc, name-s7discovery-devicename,name-s7-module,name-profinet
- Schneider: name-unite-application, name-umas-cpu, name-unite-plc In some embodiments, as detailed further below, sensor applications 402a-402b may also perform active discovery/scanning of the nodes in their respective locations. In general, active scanning entails sending traffic to the nearby nodes, to obtain additional information about them. This is in contrast to the passive monitoring of the traffic associated with the nodes, which simply looks for traffic associated with the nodes.

Example information that sensor applications 402a-402b can obtained through active scanning are as follows:
- Switch configuration parameters-management information base (MIB) information via Simple Network Management Protocol (SNMP) probing, Yet Another Next Generation (YANG) data from Netconf, Multi-Cast Filtering data, or the like.
- Precision-Time Protocol (PTP) related information (e.g., MIB. YANG information, etc.), to identify assets.
- Switches traffic information—port numbers, VLAN information, etc. etc.

Similar to any telemetry data collected via traffic DPI, sensor applications 402a-402b may provide any data obtained through active discovery/scanning to asset inventory service 320 for further analysis. As would be appreciated, switch configuration data can be used to understand network configuration in terms of subnets and multicast-filtering and related device configurations. Similarly, PTP definitions can also support the identification of the real, physical nodes/assets.

According to various embodiments, asset inventory service 320 may also obtain engineering and configuration data regarding the deployed node, if available. In general, this information can further help to reconcile situations in which a single, physical node would otherwise appear to be multiple nodes on the network. For instance, in some embodiments, this engineering and configuration data may take the form of any or all of the following:
- General Station Description (GSD) Files under the PROFINET standard.
- Controller Electronic Data Sheet (EDS) files under the ODVA standard.
- Substation Configuration Language (SCL) Files under the IEC 61850 standard, such as IED Capability Description (ICD) files, Substation Configuration Description (SCD) files, etc.

To reconcile the detected nodes and form singular identity profiles for a single, physical node, asset inventory service 320 may correlate any or all of the collected information including: a.) any observed Layer-2 and/or Layer-3 network addresses, b.) node information collected via traffic DPI and/or active scanning, and/or c.) any available engineering and configuration data regarding the deployed nodes. As a result of this correlation, asset inventory service 320 may form an identity profile for the node that is associated with its multiple addresses. To do so, in various embodiments, asset inventory service 320 may do any or all of the following:
1. For all network component (MAC, IP) sharing the same <NAME> create a node/asset identity profile
2. For all network component (MAC, IP) of a known <TYPE> create a node/asset identity profile
3. For all network component (MAC. IP) where MAC or IP is a known multicast address, create a "virtual" multicast node/asset identity profile
4. For all network component (MAC, IP) where active discovery/scanning has collected meaningful information (MIBs, etc.) create a node/asset identity profile.
5. Identify the MAC addresses of routers.
6. For all network component (MAC, IP) where MAC is belonging to a router and IP is the same than an already created asset, associate them with the same node/asset identity profile.
7. For all network component (MAC, IP) where MAC is not belonging to a router, and MAC is the same than an already created node/asset identity profile, associate them with that profile.

Figure 5:
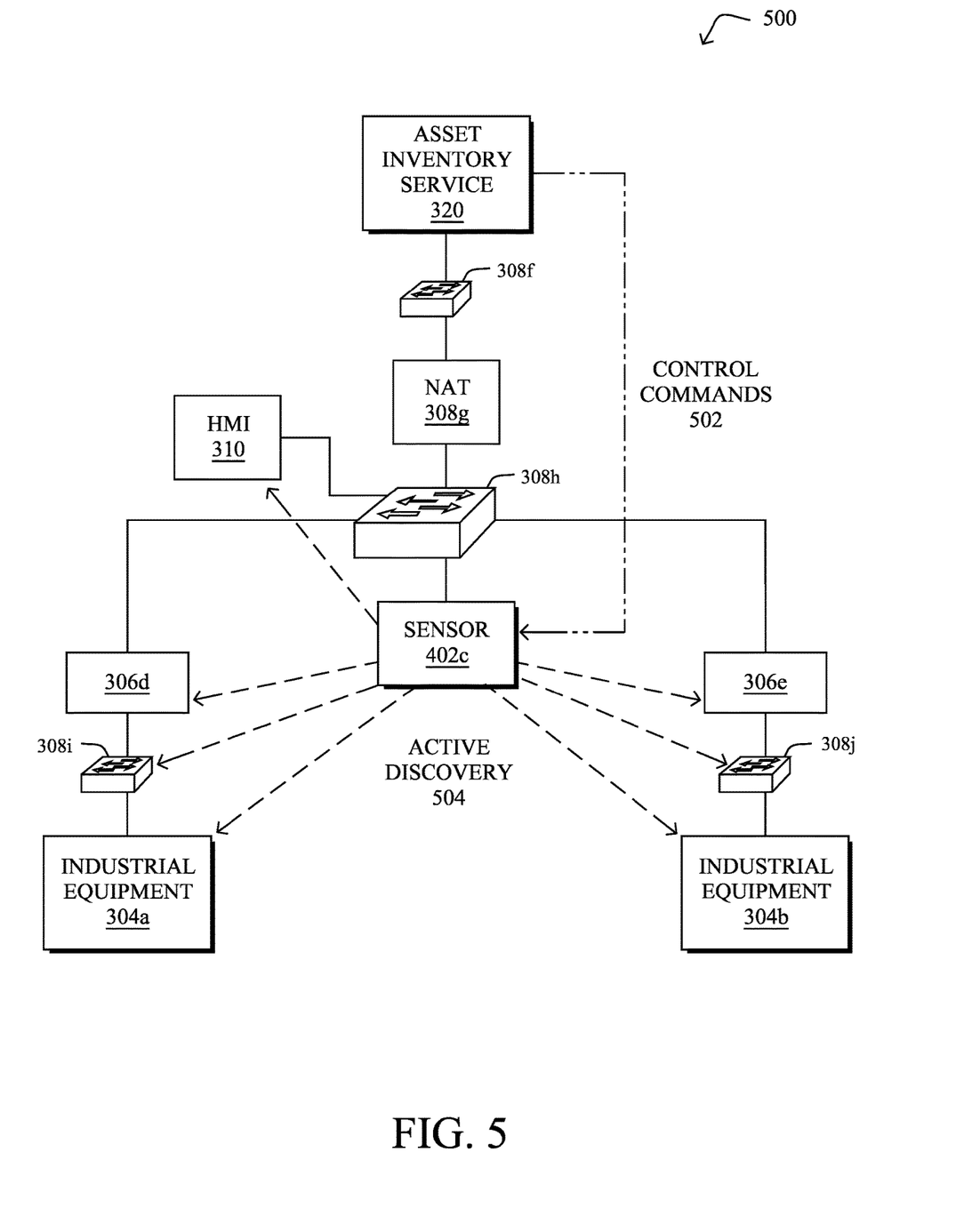
FIG. 5 illustrates an example control loop for active and passive device discovery by a sensor application.

FIG. 5 illustrates an example control loop for active and passive device discovery by a sensor application, according to various embodiments. As shown, consider a network 500 comprising industrial equipment 304a-304b controlled by controllers 306d-306e, respectively, and in communication with HMI 310. Also, as shown, assume that network 500 also includes networking equipment 308f-308j that support the communications of the network. Of particular note is that asset inventory service 320 lies on the other side of a NAT boundary as that of HMI 310, controllers 306a-306b, and industrial equipment 304a-304b, with the NAT boundary being located at NAT 306e.

According to various embodiments, as noted above, a sensor application may be deployed to networking equipment 308 located on the other side of the NAT boundary, thereby allowing asset inventory service 320 to learn additional details about the nodes on that side of the boundary, such as HMI 310, controllers 306d-306e, and industrial equipment 304a-304b. For instance, assume that sensor application 402c is deployed to switch 308h for execution. Depending on the layout of the network, further copies of the sensor application 402c may also be deployed to other networking equipment 308, as well, such as other switches, routers, gateways, and the like.

Initially, sensor application 402c may perform passive data collection regarding its nearby nodes by assessing the traffic flowing through switch 308h. For instance, sensor application 402c may perform DPI on the traffic flowing through switch 308h, to capture telemetry data regarding the nodes (e.g., the communication protocols that they use, their device types, etc.). In turn, sensor application 402c may provide this passively collected telemetry data to asset inventory service 320.

According to various embodiments, asset inventory service 320 may analyze the reported telemetry data from sensor application 402c and, based on this, send control commands 502 to sensor application 402c that instruct sensor application 402c to begin active discovery 504. As noted previously, active discovery 504 may entail sensor application 402c sending communications to the various nodes, to obtain additional information about them.

In various embodiments, control commands 502 may instruct sensor application 402c to broadcast a hello request in the semantics of a specific communication protocol detected during the passive traffic monitoring by sensor application 402c. For instance, say sensor application 402c observes a node A sending traffic using a particular communication protocol. This is a good indication that there are other nearby nodes that also communicate using that protocol. If the protocol supports hello requests to obtain additional information about a node, sensor application 402c actively sending such a message to it will help garner additional information about that node that can be used for purposes of generating/updating the identity profile for that node. In some embodiments, asset inventory service 320 may also leverage engineering data engineering data (e.g., IEC 61850 SCL/ICD/SCD definitions, Ethernet/IP EDS files, etc.) and/or object definitions (e.g.: OPC UA) related to the detected protocol, to send control commands 502, to instruct sensor application 402c to perform its active discovery.

As would be appreciated, by passively collected information about the IoT nodes, instead of flooding the network through active discovery, the approach herein is far less disruptive and less invasive by only performing active discovery as needed. This is particularly advantageous in networks where the network supports safety systems, automation or manufacturing processes, and the like. In addition, the control loop-based approach herein also does not require entry of IP address scan ranges or having to guess which protocol is being used on a specific machine or process at the edge of the network. The intelligence built into the closed-loop system automates the active discovery. In some instances, all that may be required is or an administrator to enable the active discovery mechanism introduced herein.

In addition to providing less overhead on the network than traditional device discovery approaches, the techniques herein also allow for the profiling of devices across NAT boundaries, which are becoming increasingly used in IoT networks. Indeed, by embedding sensor applications onto the networking equipment (e.g., switches) across the NAT boundary, the active discovery is distributed and initiated from below the NAT layer. This results in 100% visibility to the nodes in the network and addresses the needs of IoT networks that are divided into discrete units such as zones, cells, etc.

Figure 6:
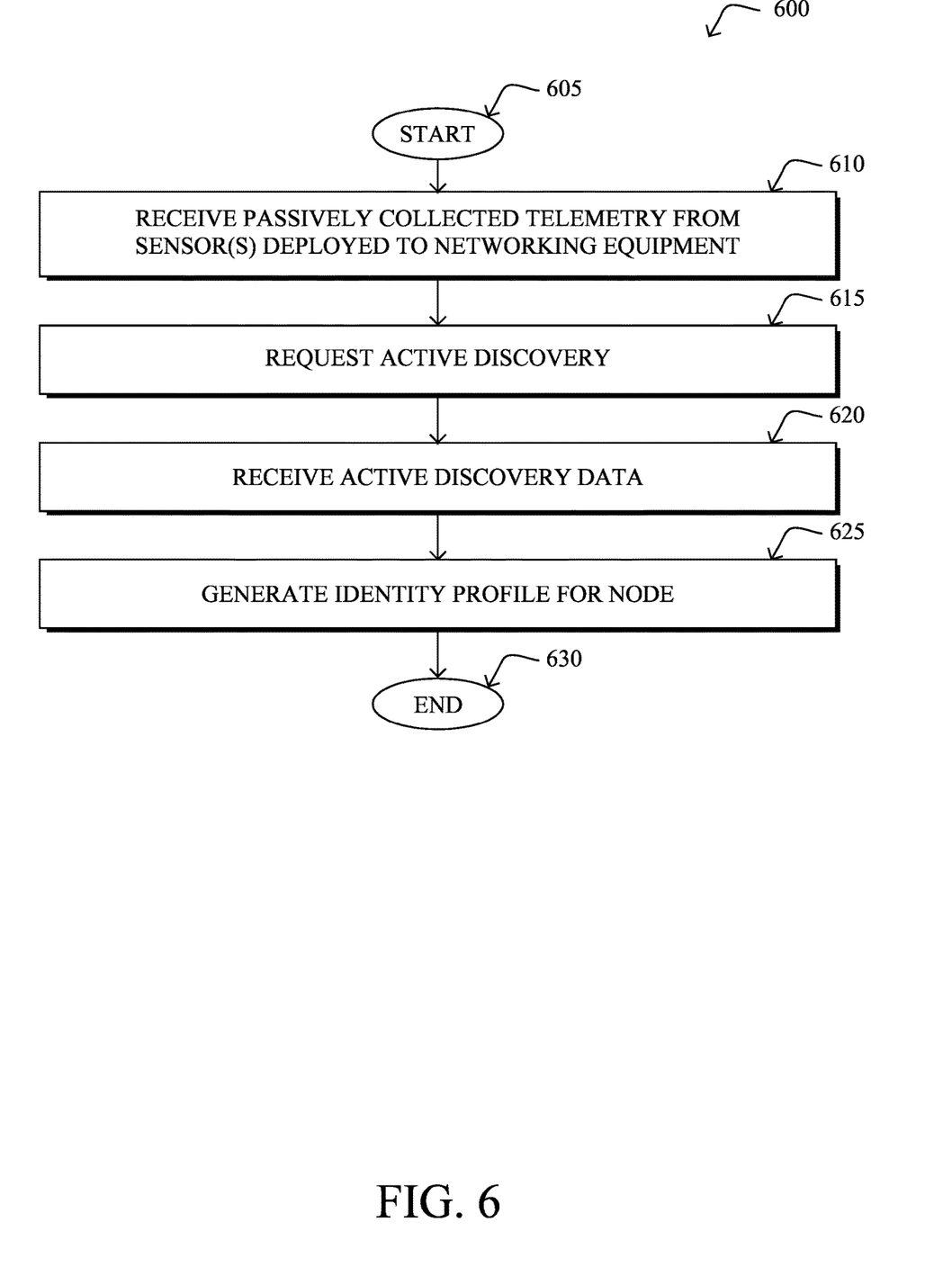
FIG. 6 illustrates an example simplified procedure for identifying a device in a network.

FIG. 6 illustrates an example simplified procedure for identifying a device in a network, in accordance with one or more embodiments described herein. In various embodiments, a non-generic, specifically configured device (e.g., device 200) may perform procedure 600 by executing stored instructions (e.g., process 248), such as one or more devices that provide an asset inventory service to a network. The procedure 600 may start at step 605, and continues to step 610, where, as described in greater detail above, the asset inventory service may receive telemetry data collected passively by a sensor application regarding a node in a network. In various embodiments, the sensor application may be hosted by networking equipment located on a different side of a NAT boundary in the network than that of the asset inventory service. For instance, a network switch, router, gateway, etc., located on the other side of the NAT boundary may execute the sensor application to collect the telemetry data, passively, by performing DPI on traffic flowing through it. Such telemetry data may indicate, for example, the communication protocol(s) used by a node, its address information, and the like.

At step 615, as detailed above, the asset inventory service may request, after receiving the telemetry data, that the sensor application perform active discovery of nodes in the network. In various embodiments, the asset inventory service may request that the active discovery be performed according to a communication protocol observed by the sensor application and reported via the telemetry data to the asset inventory service. In further embodiments, the asset inventory service may also base its request in part on any engineering or configuration data that is available, such as GSD files, EDS files, SCL files, or the like.

At step 620, the asset inventory service may receive active discovery data collected by the sensor application via active discovery of nodes in the network, as described in greater detail above. For instance, the sensor application may perform the active discovery by broadcasting hello/discovery messages to nodes in the network, in accordance with a particular communication protocol. In response, the node(s) may reply with information about themselves to the sensor application, which forwards the response information to the asset inventory service as active discovery data.

At step 625, as detailed above, the asset inventory service may generate, based on the telemetry data and the active discovery data, an identity profile for the node. In some embodiments, this may entail determining that two or more network addresses (e.g., MAC addresses, etc.) are different addresses for the same node, such as when the telemetry data and active discovery data indicate two or more network addresses. In some cases, one or more of these addresses may even be reused elsewhere in the network, such as when address spaces use in different cells, zones, etc. overlap. In various embodiments, the identity profile of the node (e.g., what the node is, how the node communicates, etc.) may be used to assign a policy to the node, such as a security policy that restricts where the node may communicate, network policies that dictate the QoS of the traffic associated with the node, etc. Procedure 600 then end at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

While there have been shown and described illustrative embodiments for the identification of devices and device intents in a network, it is to be understood that various other adaptations and modifications may be made within the intent and scope of the embodiments herein. For example, while specific endpoint device types are described, the techniques can be applied to any number of different types of devices. Further, while the techniques herein are described as being performed at certain locations within a network, the techniques herein could also be performed at other locations, as desired (e.g., fully in the cloud, fully within the local network, etc.).

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/ RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true intent and scope of the embodiments herein.

What is claimed is:

1. A method comprising:
receiving, at an asset inventory service executed by one or more devices, telemetry data collected passively by a sensor application regarding a node in a network, wherein the sensor application passively collects the telemetry data by performing deep packet inspection (DPI) on traffic flowing through networking equipment located on a different side of a Network Address Translation (NAT) boundary defined by a NAT layer in the network than that of the asset inventory service;
requesting, by the asset inventory service and after receiving the telemetry data, that the sensor application perform active discovery of nodes in the network by broadcasting a hello request to the nodes using a communication protocol detected from the telemetry data passively collected by the sensor application;
receiving, at the asset inventory service, active discovery data collected by the sensor application via the active discovery of the nodes in the network; and
generating, by the asset inventory service and based on the telemetry data, the active discovery data, and engineering and configuration data associated with the node, an identity profile for the node that comprises two or more unique IP address-MAC address pairs associated with the node, wherein the telemetry data and the active discovery data indicate two or more different IP addresses or two or more different MAC addresses for the node, further wherein the engineering and configuration data comprises at least one of: a General Station Description (GSD) file, an Electronic Data Sheet (EDS) file, or a Substation Configuration Language (SCL) file.

2. The method as in claim 1, wherein the sensor application and the nodes actively discovered by the sensor application are located on the different side of the NAT boundary than that of the asset inventory service.

3. The method as in claim 1, wherein the networking equipment comprises at least one of: a switch, a router, or a gateway.

4. The method as in claim 1, wherein, in response to the hello request, at least one of the nodes sends information about itself to the sensor application, wherein the active discovery data received by the asset inventory service comprises the information.

5. The method as in claim 1, wherein at least one of the two or more different IP addresses or two or more different MAC addresses is reused elsewhere in the network.

6. The method as in claim 1, wherein the node comprises a remote terminal unit, programmable logic controller, or a substation intelligent electronic device.

7. The method as in claim 1, further comprising:
assigning a policy to the node, based on its identity profile.

8. An apparatus, comprising:
one or more network interfaces;
a processor coupled to the one or more network interfaces and configured to execute one or more processes; and
a memory configured to store a process that is executable by the processor, the process when executed configured to:
receive telemetry data collected passively by a sensor application regarding a node in a network, wherein the sensor application passively collects the telemetry data by performing deep packet inspection (DPI) on traffic flowing through networking equipment located on a different side of a Network Address Translation (NAT) boundary defined by a NAT layer in the network than that of the apparatus;
request, after receiving the telemetry data, that the sensor application perform active discovery of nodes in the network by broadcasting a hello request to the nodes using a communication protocol detected from the telemetry data passively collected by the sensor application;
receive active discovery data collected by the sensor application via the active discovery of the nodes in the network; and
generate, based on the telemetry data, the active discovery data, and engineering and configuration data associated with the node, an identity profile for the node that comprises two or more unique IP address-MAC address pairs associated with the node, wherein the telemetry data and the active discovery data indicate two or more different IP addresses or two or more different MAC addresses for the node, further wherein engineering and configuration data comprises at least one of: a General Station Description (GSD) file, an Electronic Data Sheet (EDS) file, or a Substation Configuration Language (SCL) file.

9. The apparatus as in claim 8 wherein the sensor application and the nodes actively discovered by the sensor application are located on the different side of the NAT boundary than that of the apparatus.

10. The apparatus as in claim 8, wherein the networking equipment comprises at least one of: a switch, a router, or a gateway.

11. The apparatus as in claim 8, wherein, in response to the hello request, at least one of the nodes sends information about itself to the sensor application, wherein the active discovery data received by the apparatus comprises the information.

12. The apparatus as in claim 8, wherein at least one of the two or more different IP addresses or two or more different MAC addresses is reused elsewhere in the network.

13. The apparatus as in claim 8, wherein the node comprises a remote terminal unit, programmable logic controller, or a substation intelligent electronic device.

14. A tangible, non-transitory, computer-readable medium storing program instructions that cause an asset inventory service executed by one or more devices to perform a process comprising:
receiving, at the asset inventory service, telemetry data collected passively by a sensor application regarding a node in a network, wherein the sensor application passively collects the telemetry data by performing deep packet inspection (DPI) on traffic flowing through networking equipment located on a different side of a Network Address Translation (NAT) boundary defined by a NAT layer in the network than that of the asset inventory service;
requesting, by the asset inventory service and after receiving the telemetry data, that the sensor application perform active discovery of nodes in the network by broadcasting a hello request to the nodes using a communication protocol detected from the telemetry data passively collected by the sensor application;

receiving, at the asset inventory service, active discovery data collected by the sensor application via the active discovery of the nodes in the network; and generating, by the asset inventory service and based on the telemetry data, the active discovery data, and engineering and configuration data associated with the node, an identity profile for the node that comprises two or more unique IP address-MAC address pairs associated with the node, wherein the telemetry data and the active discovery data indicate two or more different IP addresses or two or more different MAC addresses for the node, further wherein the engineering and configuration data comprises at least one of: a General Station Description (GSD) file, an Electronic Data Sheet (EDS) file, or a Substation Configuration Language (SCL) file.

* * * * *